J. A. CLARKE, Jr., AND S. B. SCHENCK.
SYSTEM OF CONTROL.
APPLICATION FILED NOV. 5, 1915.
1,371,603.
Patented Mar. 15, 1921.
2 SHEETS—SHEET 1.
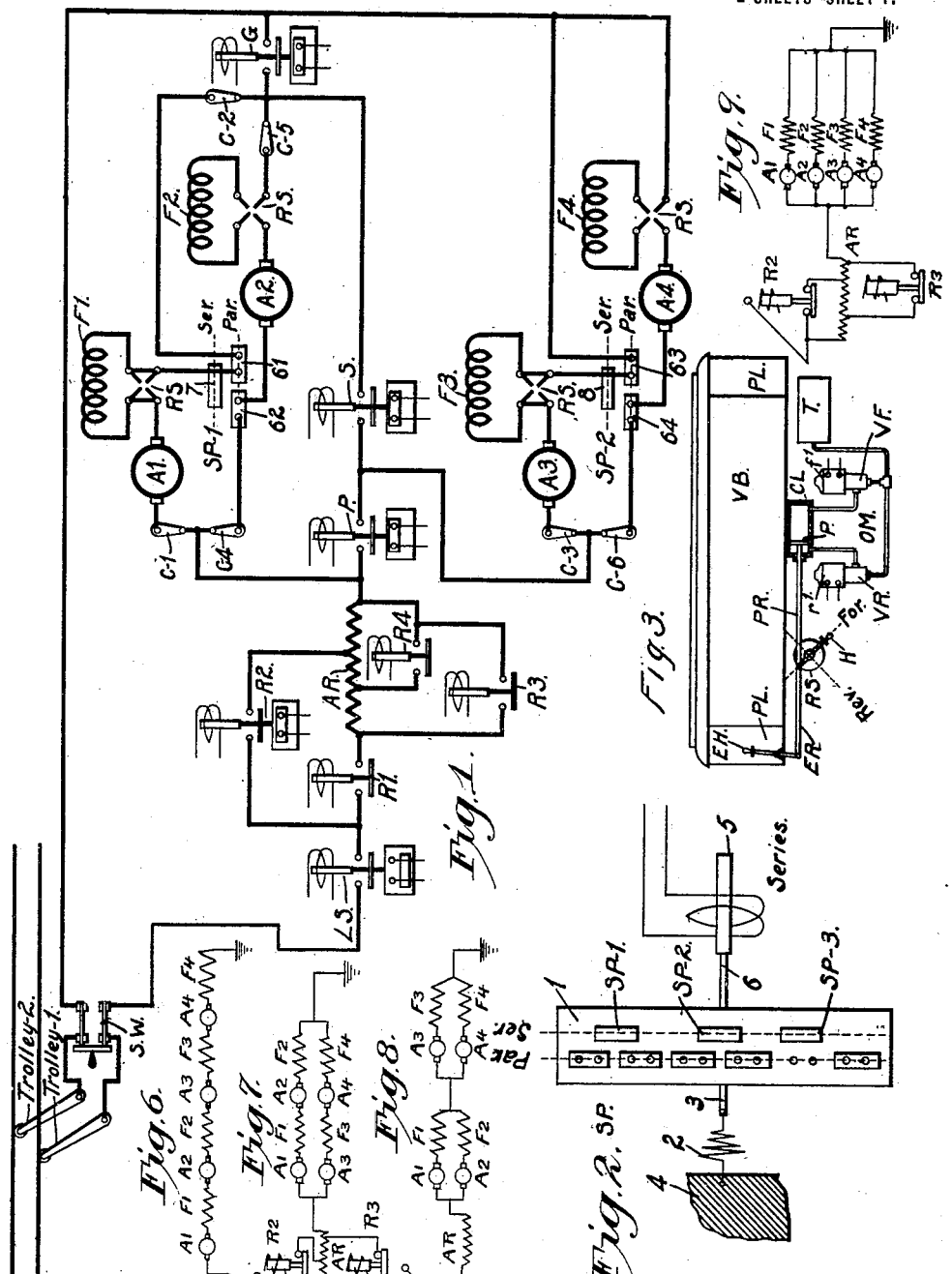
WITNESSES:
INVENTOR
John A. Clarke Jr.
& Samuel B. Schenck.
BY
ATTORNEY

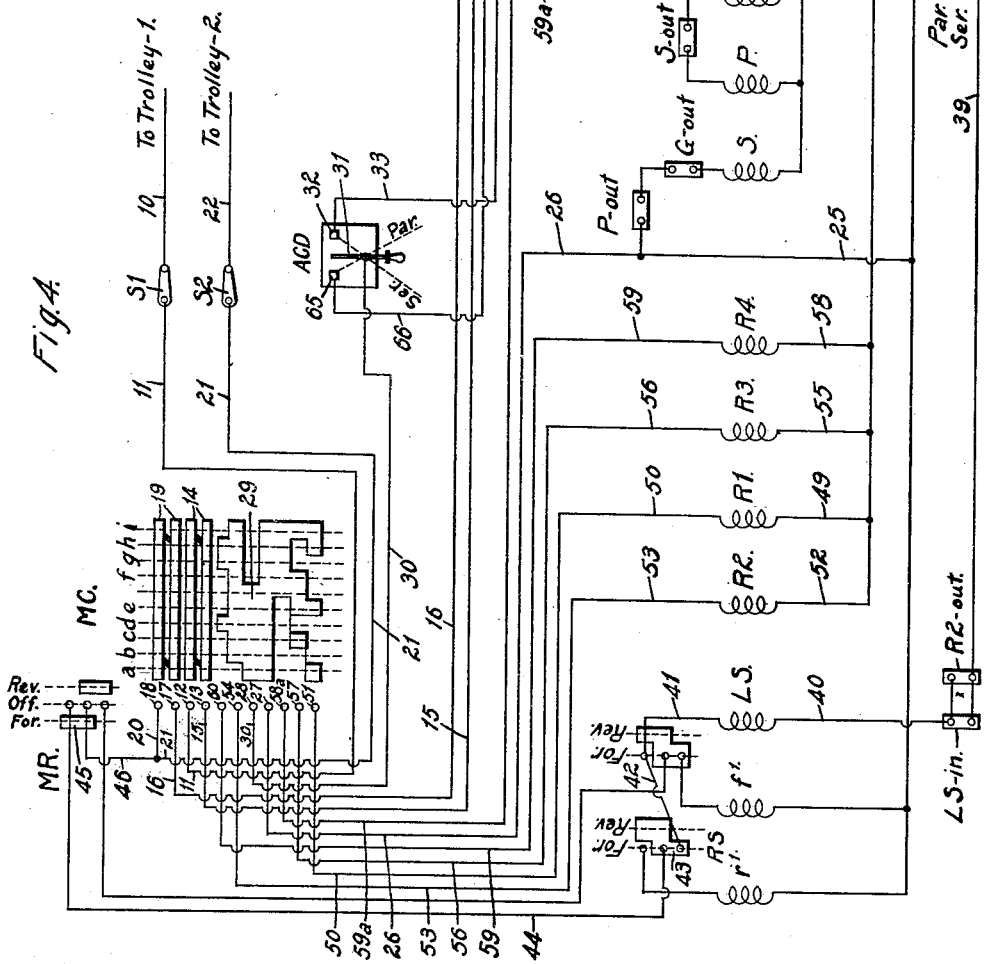

UNITED STATES PATENT OFFICE.

JOHN A. CLARKE, JR., AND SAMUEL B. SCHENCK, OF WILKINSBURG, PENNSYLVANIA, ASSIGNORS TO WESTINGHOUSE ELECTRIC AND MANUFACTURING COMPANY, A CORPORATION OF PENNSYLVANIA.

SYSTEM OF CONTROL.

1,371,603.  Specification of Letters Patent.  Patented Mar. 15, 1921.

Application filed November 5, 1915. Serial No. 59,822.

*To all whom it may concern:*

Be it known that we, JOHN A. CLARKE, JR., a citizen of the United States, and a resident of Wilkinsburg, in the county of Allegheny and State of Pennsylvania, and SAMUEL B. SCHENCK, a citizen of the United States, and a resident of Wilkinsburg, in the county of Allegheny and State of Pennsylvania, have invented a new and useful Improvement in Systems of Control, of which the following is a specification.

Our invention relates to systems of control and it has special reference to the control of electric railway vehicle motors and the like.

One of the objects of our invention is to provide a system of the above-indicated character which shall be relatively simple and inexpensive in construction and effective and reliable in operation, and which shall permit of a relatively great degree of flexibility of operation to meet varied conditions of service.

Another object of our invention is to provide a system having a plurality of pairs of propelling motors which are provided with a series-parallel switching device for connecting each pair of motors in series or parallel relation and wherein the series-parallel switching device is adapted to automatically assume the parallel-connecting position upon a failure of supply-circuit voltage or any equivalent failure, whereby a closed loop is formed under such emergency conditions and, by the simple reversal of the main-circuit reversing-switch, a dynamic braking current may be caused to flow through each of said loops to brake the railway vehicle.

In some classes of service, a three-speed system embodying four driving motors is at times desired, such running speeds being secured when the motors are in full series relation, full series-parallel relation, and full parallel relation. On the other hand, if the locomotive or motor car is hauling a relatively heavy load, as a freight train for example, it may be necessary to employ a relatively heavy starting torque and run at a rather slow average speed, in which case only series and series-parallel operation is desirable, or with a somewhat less starting torque and a higher average speed, when a lighter load is being hauled, at which time series-parallel and parallel operation is preferable.

Moreover, in some instances, a locomotive or motor car is employed alone, at times, as a passenger vehicle or to carry a relatively light freight load at a relatively high schedule speed, while, during other periods, the locomotive or motor car may be utilized to haul relatively heavy freight loads at a relatively low schedule speed with correspondingly increased torque. Under such circumstances, a series-parallel and parallel operation is requisite to obtain the desired higher schedule speed, while, with the relatively heavy loads a series and series-parallel operation is necessary to give the desired conditions. As another instance, a higher average speed may be desired during the interurban portion of the run, whereas a lower average speed may be necessary when running through cities and towns. Heretofore, so far as we are aware, no system has been devised to provide the above-described flexibility of operation, but, in some cases, controllers for successively connecting the motors in series, series-parallel and parallel relation have been employed to approximate the desired conditions.

According to our present invention, we provide a motor-governing controller having two groups of accelerating positions that may be employed either for series and series-parallel operation or for series-parallel and parallel operation, and certain relatively simple and inexpensive switching devices that are associated therewith to procure the above-mentioned results. A series-parallel switching device is employed for connecting each pair of motors in either series or parallel relation and is biased to the parallel-connecting position, a suitable electrically-controlled device being employed to actuate the switching device to the series position, when desired. An auxiliary control switch is employed to govern the actuation of the switching device, and the control circuits are arranged and interlocked to effect, in conjunction with the controller, series and series-parallel operation when the auxiliary switch occupies one position and to effect series-parallel and parallel operation of the motors when the control switch assumes its other position. When the motors comprising each pair are disposed in series relation, so that no closed circuit including a pair of motors is available, if the supply-circuit voltage fails or other emergency conditions arise, the series-parallel switching device automatically assumes its parallel-connecting position, and the train operator merely has to throw the reverser to its reverse position to set up a plurality of dynamic braking currents through the several loops that are formed by the respective pairs of motors.

In the accompanying drawings, Figure 1 is a diagrammatic view of the main circuits of a system of control embodying our invention; Fig. 2 is a diagrammatic view of the structural features of the series-parallel switch that is employed in connection with our invention; Fig. 3 is a diagrammatic view of normal and emergency means for operating the main-circuit reversing switch, as mounted on a railway vehicle; Fig. 4 is a diagrammatic view of an auxiliary governing system for manipulating the various main-circuit switches that are shown in Fig. 1, in accordance with a sequence chart of well-known form that is shown in Fig. 5; and Figs. 6, 7, 8 and 9 are diagrammatic views of the motor combinations more particularly hereinafter explained.

Referring to Fig. 1 of the drawings, the system shown comprises a plurality of supply-circuit conductors respectively marked Trolley-1 and Trolley-2; a plurality of dynamo-electric machines respectively having armatures A1, A2, A3 and A4 and field-magnet windings F1, F2, F3 and F4; a main-circuit reversing-switch RS, preferably of an electrically-controlled type, as illustrated in Fig. 3; a plurality of main-circuit switches LS, S, P and G; an accelerating resistor AR, with which a plurality of switches R1, R2, R3 and R4 are associated to gradually vary the circuit resistance as the motor speed increases; a plurality of cut-out switches C-1 to C-6, inclusive; and a plurality of groups of contact members SP-1, SP-2 and SP-3.

The location and construction of the main-circuit reversing switch are diagrammatically shown in Fig. 3, with respect to the body of a vehicle. The structure illustrated comprises a vehicle body VB having the customary platforms PL for housing the train operators; the reversing switch RS, which is shown as being of the familiar drum type; an electrically-controlled, pneumatically-actuated operating mechanism OM therefor; a manually operable handle H that is directly associated with the reversing-switch drum, in accordance with customary practice; and an emergency handle EH that may be disposed on one or both of the operating platforms PL.

The operating mechanism OM is of a familiar type and comprises a piston P that operates within a suitable cylinder CL and is actuated toward the one or the other end of the cylinder in accordance with the operation of a pair of magnet valves VF and VR. The valves are respectively governed by actuating coils $f'$ and $r'$, which are connected in circuit as shown in Fig. 4 and are adapted to admit fluid pressure from a suitable reservoir or tank T to the one or the other side of the piston P, whereby the reversing switch RS is actuated, through the agency of a suitable piston rod PR to either its forward position "For." or its reversing position "Rev."

The emergency handle EH is suitably fulcrumed near the floor of the vehicle platform and is pivotally associated with a rod ER that is here shown as forming an extension of the piston rod PR.

Consequently, the reversing switch RS may be operated in the usual manner by energizing the one or the other of the actuating coils $f'$ and $r'$ or by manipulating the emergency handle EH in case of failure of supply-circuit voltage or air-pressure.

It will be understood that the type of emergency operating mechanism just described is shown for illustrative purposes only, and any other suitable apparatus may be employed.

Although we have shown our invention as embodying a complete metallic supply circuit, it will be understood that the customary railway supply circuit embodying a positive trolley conductor and a ground return may be employed, if desired.

The series-parallel switch SP that is employed in connection with our invention is best shown in Fig. 2 and comprises a main body member, here shown as a plate or board 1, which is adapted to assume a plurality of operative positions marked "Ser." and "Par.", standing for series and parallel, respectively; the groups of contact members SP-1, SP-2 and SP-3 which are suitably located upon the plate 1; a suitable biasing means, such as a spring 2, that is interposed between a projecting member or arm 3 of the plate 1 and any convenient stationary portion 4 of an incasing member, for example, whereby the switching device is biased to its parallel position; a magnetizable core member 5 that is secured to the plate 1 by means of a suitable rod or other member 6; and an actuating coil marked "Series" for acting upon the core member 5 to overcome the biasing spring 2 and actuate the switching device to its series position when the coil "Series" is energized.

It will be understood that, although for the sake of simplicity and clearness, we have illustrated our series-parallel switching device as of a plate type having a translating motion, the preferred structure comprises a drum controller that is of a familiar type, and a rotative movement is imparted to the controller in any suitable manner by the biasing spring 2 and the actuating coil "Series." In some instances, an electrically-controlled, pneumatically-operated device, similar to that shown in Fig. 3, for actuating the switching device to the "series" position may be desirable.

Reference may now be had to Fig. 4, wherein the system shown comprises, in addition to the actuating coils for the various main-circuit switches that are illustrated in Fig. 1 and a plurality of electrical interlocks that are associated with, and adapted to be actuated by, the several switches in the manner that is shown in Fig. 1, a master controller MC which is adapted to occupy a plurality of operative positions $a$ to $i$, inclusive; a master reverser MR of a familiar type that is adapted to occupy an off, a forward and a reverse position for suitably governing the actuating coils $f'$ and $r'$ of the main-circuit reversing-switch RS; a control resistor CR of a familiar type; the group SP-3 of contact members of the series-parallel switching device; and an auxiliary control device or switch ACD that is adapted to occupy a "series" and a "parallel" position for correspondingly governing the series-parallel switching device.

Assuming that the auxiliary control device ACD occupies its "series" position, that the master reverser MR and the main reversing switch RS occupy their respective forward positions, and that the master controller MC is actuated to its initial operative position $a$, the operation of the system may be set forth as follows:

A circuit is first established from Trolley-1, through conductor 10, a switch S1, conductor 11, control fingers 12 and 13 which are bridged by a contact segment 14 of the master controller MC, conductor 15, the control resistor CR, conductor 16, control fingers 17 and 18 which are bridged by contact segment 19 of the master controller, conductors 20 and 21, a switch S2 and conductor 22 to Trolley-2.

A circuit is then established from an intermediate point 23 of the control resistor CR, through conductors 24, 25 and 26, control fingers 27 and 28 which are bridged by contact segment 29 of the master controller, conductor 30, movable contact member 31 and stationary contact member 32 of the auxiliary control device ACD, conductors 33 and 34, the actuating coil "Series" of the series-parallel switching device and conductor 35 to the negative conductor 16, thereby actuating the device to its series position.

A circuit is next established from the conductor 33, through conductor 36, contact member 37 of the series-parallel switch contact group SP-3 in the series position of the switch, conductors 38 and 39, interlock R2-out, conductor 40, the actuating coil of the switch LS, conductors 41 and 42, contact segment 43 of the main-circuit reversing-switch in its forward position, conductor 44, contact segment 45 of the master reverser MR in its forward position, conductor 46 and conductor 20, which is connected to the negative conductor 16 in the manner already described. Upon the closure of the switch LS, a holding interlock LS-in bridges the interlock R2-out.

Another circuit is established at this time from a second intermediate point 47 of the control resistor, through conductors 48 and 49, the actuating coil of the switch R1, conductor 50, and control finger 51 which engages contact segment 29.

A further circuit is completed from the conductor 26, through interlocks P-out and G-out, the actuating coil of the switch S, and conductor 35 to the negative conductor 16.

At this time, the main-circuit connections are as follows: from the Trolley-1 through one blade of a suitable switch SW, the switches LS and R1, the accelerating resistor AR, the switch C-1, the armature A1, the field-magnet winding F1 and the reversing-switch RS in its forward position, contact member 7 of the contact group SP-1 of the series-parallel switching device, the armature A2, the field-magnet winding F2 and the reversing-switch RS, switches C-5, S, and C-3, the armature A3, the field-magnet winding F3 and the reversing-switch RS, contact member 8 of the contact group SP-2 of the series-parallel switching device, the armature A4 and the field-magnet winding F4 and the reversing-switch RS to the second blade of the switch SW and Trolley-2. The motors are thus disposed in series relation with the accelerating resistor AR across the supply circuit, as shown in Fig. 6.

When the master controller MC is moved to its second position $b$, a circuit is established from the conductor 48, through conductor 52, the actuating coil of the switch R2, conductor 53, and control finger 54 which engages the contact segment 29 of the master controller. At the same time, the switch R1 is opened by reason of the disengagement of the control finger 51 and the contact segment 29.

In position $c$ of the master controller, a circuit is completed from the conductor 48, through conductor 55, the actuating coil of the switch R3, conductor 56, and control finger 57 which engages contact segment 29.

In position $d$, a circuit is established from the conductor 48, through conductor 58, the actuating coil of the switch R4, conductor 59 and control finger 60 which engages contact segment 29. In this position, the switch R3 is opened by reason of the disengagement of control finger 57 and contact segment 29.

In position $e$, the switches R1 and R3 are again closed in the manner hereinbefore described, while the switch R4 is opened, and the motors are disposed in full-series relation, the accelerating resistor AR being entirely short-circuited.

To effect transition of the motors to series-parallel relation, the switch G is first closed by reason of the completion of a circuit from the contact segment 29, through control finger 58a, conductor 59a, and the actuating coil of the switch G to conductor 35, which is directly connected to the negative conductor 16. The switch R1 is also opened at this time.

As soon as the switch G closes, the switch S is opened by reason of the exclusion from the control circuit of its actuating coil of the interlock G-out, and upon the opening of the switch S, the switch P is closed by reason of the completion of a circuit from conductor 59a through interlock S-out and the actuating coil of the switch P to the negative conductor 35.

When the master controller occupies its position $f$, the motors are disposed in initial series-parallel relation, as shown in Fig. 7, and in the succeeding controller positions $g$, $h$ and $i$, the switch R4 is closed and the switch R3 is opened, the switch R1 is closed, and the switch R4 is opened, respectively, whereby the motors are arranged in full series-parallel relation.

Assuming that, by reason of the service conditions hereinbefore mentioned, it is desired to operate the motors in series-parallel and parallel relation rather than in the series and series-parallel relation that has just been described, the auxiliary control device ACD is first actuated to its position "Par.", whereupon the biasing spring 2 moves the series-parallel switching device SP to its parallel-connecting position.

In this case, when the master controller is actuated to its initial position $a$, the switches S and R1 are closed in the manner previously described, while the circuit of the actuating coil of the switch LS is established from the intermediate point 23 of the control resistor CR, through the master controller MC, as previously set forth, to the movable contact member 31 of the auxiliary control device, from which point circuit is completed through stationary contact member 65 of the auxiliary control device, conductor 66, contact member 67 of the contact group SP-3 of the series-parallel switching device in its parallel-connecting position, and conductor 68 to the conductor 39, whence circuit is completed in the manner hereinbefore described.

The main circuits at this time may be traced as follows: from Trolley-1 through the switches LS and R1, the accelerating resistor AR to a point where the circuit divides, one branch including switch C-1, armature A1, field magnet winding F1 and the reversing switch RS in its forward position, contact member 61 of the contact group SP-1 of the series-parallel switching device in its parallel-connecting position, and the switch C-2 to a second junction-point, while the other branch includes switch C-4, contact member 62 of the contact group SP-1, the armature A2, field-magnet winding F2 and the reversing-switch RS, and switch C-5 to the aforesaid second junction-point, whence circuit is continued through the switch S to a point where the circuit again divides, one branch including switch C-3, armature A3, field-magnet winding F3 and the reversing switch RS, contact member 63 of the contact group SP-2 to a fourth junction-point, and the other branch including switch C-6, contact member 64 of the contact group SP-2, armature A4 and field-magnet winding F4 and the reversing-switch RS to the fourth junction-point referred to, whence circuit is completed to the Trolley-2.

The motors are thus initially disposed in series-parallel relation, as illustrated in Fig. 8, and by the manipulation of the master controller MC through its successive operative positions, the resistor AR is gradually short-circuited in the manner hereinbefore set forth, transition to initial parallel relation of the motors, Fig. 9, is then effected, and the resistor AR is again short-circuited to bring the motors to full parallel relation.

Assuming that it is desired to use the three running speeds of the motor, in accordance with the service conditions hereinbefore mentioned, namely, full series, full series-parallel and full parallel relation of the motors, the auxiliary control device ACD should be initially connected in its "series" position and the master controller MC is then actuated to the full series position $e$. To effect further acceleration, the master controller is returned to its initial operative position $a$, and the auxiliary control device ACD is moved to its "parallel" position, whereby the motor circuits are temporarily opened by reason of the deënergization of the actuating coil of the switch LS, and the series-parallel switching device is automatically actuated to its parallel-connecting position by reason of the biasing spring 2.

However, as soon as the auxiliary control device ACD occupies its "parallel" position, the circuit of the actuating coil of the switch LS is completed through the contact member 67 of the contact group SP-3, and the interlock R2-out, as hereinbefore described, it being necessary to return the controller to its initial position $a$ in order to be able to employ the interlock R2-out.

The master controller may then be operated through its successive positions *a* to *i*, inclusive, to gradually effect series-parallel and parallel operation of the motors in the manner hereinbefore described.

It will be understood that the change-over operation of the auxiliary control device ACD and of the master controller MC occupies a relatively short time, and, consequently, the transition of the motor connections from full series to initial series-parallel relation is accomplished without any undesirable results such as a sudden jump in the motor speed, or flashing conditions by reason of the temporary interruption of the motor current.

If, at any time when the motors of each pair are in series relation, the supply-circuit voltage should fail or in case of pneumatically-operated means for actuating the series-parallel switching device, if the air pressure should fail, then the series-parallel switching device is immediately and automatically actuated to its parallel-connecting position by reason of the action of the biasing spring 2, and the motorman or train-operator merely has to throw the emergency handle EH to reverse the electrical relations of the various armatures and field windings, and set up dynamic braking currents in the various closed circuits that are formed by the pairs of motors. In this way, an effective and reliable emergency braking system is provided.

It will be understood that, if it is desired to employ dynamic braking under ordinary conditions, the master controller is returned to the off position and the master reverser is reversed, thereby actuating the main reversing-switch to its reversed position, in the customary manner.

It should be noted that, since the switch LS is interlocked through the contact member 37 of the contact group SP-3, which contact member corresponds to the series position of the switching device, the switch LS cannot be closed until the actuating coil "Series" of the switching device is energized and the device has moved to its series position. Moreover, whenever the circuit of the actuating coil "Series" is interrupted, the energizing circuit of the actuating coil of the switch LS is also deënergized, and, in any case, the main motor circuits are made and broken by the contact members of the switch LS and not by the contact members of the series-parallel switching device. Consequently, no blow-out coils are required with the series-parallel switching device and a simple device of the type illustrated in Fig. 2 is all that is necessary.

We do not wish to be restricted to the specific location and arrangement of control circuits or the structural details herein set forth, as various modifications thereof may be effected without departing from the spirit and scope of our invention. We desire, therefore, that only such limitations shall be imposed as are indicated in the appended claims.

We claim as our invention:

1. In a system of control, the combination with a plurality of electric motors severally having armatures and field-magnet windings, and a series-parallel switching device therefor, of electrical means for actuating said device to the series-connecting position, mechanical means dependent upon a failure of said first means for automatically actuating said device to the parallel-connecting position, and means for effecting the reversal of said field windings to effect dynamic braking through the motor circuits closed by the series-parallel switching device.

2. In a system of control, the combination with a supply circuit, a plurality of electric motors severally having armatures and field-magnet windings, a reversing-switch and a series-parallel switching device for said motors, of means for actuating said device to the series-connecting position, means dependent upon a failure of supply-circuit voltage for automatically actuating said device to the parallel-connecting position, and means for throwing said reversing-switch to effect dynamic braking through the motor circuits closed by the series-parallel switching device.

3. In a system of control, the combination with a plurality of pairs of electric motors, of a series-parallel switching device for connecting each pair of motors in series or parallel relation, a controller for governing said motors, an auxiliary control device associated with said controller and said switching device and adapted to assume a plurality of positions, and means for effecting series and series-parallel operation of said motors in conjunction with said controller when said auxiliary control device occupies one position and for effecting series-parallel and parallel operation of said motors in conjunction with said controller when said control device occupies another position.

4. In a system of control, the combination with a plurality of pairs of electric motors, of a series-parallel switching device for connecting each pair of motors in series or parallel relation, means for actuating said switching device to one position, means for biasing said device to its other position, a controller for governing said motors, an auxiliary control switch associated with said controller and adapted to assume a plurality of positions respectively corresponding to the positions of said switching device, and control means for effecting series and series-parallel operation of said motors in conjunction with said controller when said auxiliary control switch occupies its "series" position and for effecting series-parallel and parallel operation of said motors in conjunction with said controller when said control switch occupies its "parallel" position.

5. In a system of control, the combination with a plurality of pairs of electric motors, of a series-parallel switching device for connecting each pair of motors in series or parallel relation, means for biasing said switching device to its parallel-connecting position, electrical means for overcoming said biasing means to actuate said device to its series-connecting position, a controller for governing said motors and having two groups of accelerating positions, an auxiliary control switch adapted to assume a "series" and a "parallel" position and arranged to effect the energization of said electrical means through said controller, and control means for effecting series and series-parallel operation of said motors in conjunction with the two groups of positions of said controller when said auxiliary control switch occupies its "series" position and for effecting series-parallel and parallel operation of said motors in conjunction with the same groups of positions when said control switch occupies its "parallel" position.

6. In a system of control, the combination with a plurality of pairs of electric motors, and a series-parallel switching device for connecting each pair of motors in series or parallel relation, of a governing controller therefor having only two groups of accelerating positions, and means associated with said switching device for effecting either series and series-parallel acceleration or series-parallel and parallel operation of said motors in conjunction with said two groups of positions.

7. In a system of control, the combination with a plurality of pairs of electric motors, of a governing controller therefor having only two groups of accelerating positions, an auxiliary control switch having a plurality of positions respectively corresponding to series and parallel connection of each pair of motors, and means for initially effecting series acceleration of said motors by actuating said controller through said first group of positions when said control switch occupies its "series" position and for subsequently effecting series-parallel and parallel acceleration of said motors by first returning the controller to its initial operative position and actuating said control switch to its "parallel" position and then actuating said controller through said two groups of positions.

8. In a system of control, the combination with a plurality of pairs of electric motors, of a governing controller therefor having only two groups of accelerating positions, a series-parallel switching device for connecting each pair of motors in series or parallel relation, means for biasing said switching device to the parallel-connecting position, electrical means for overcoming said biasing means to actuate said device to the series-connecting position, an auxiliary control switch adapted in a "series" position to effect the energization of said electrical means through said controller and adapted in a "parallel" position to permit the action of said biasing means, and means for initially effecting series acceleration of said motors by actuating said controller through said first group of positions when said control switch occupies its "series" position and for subsequently effecting series-parallel and parallel acceleration of said motors by first returning the controller to its initial operative position and actuating said control switch to its "parallel" position and then actuating said controller through said two groups of positions.

9. In a system of control, the combination with a plurality of pairs of electric motors, of a governing controller therefor having only two groups of accelerating positions, a series-parallel switching device for connecting each pair of motors in series or parallel relation, means for biasing said switching device to the parallel-connecting position, electrical means for overcoming said biasing means to actuate said device to the series-connecting position, an auxiliary control switch adapted in a "series" position to effect the energization of said electrical means through said controller and adapted in a "parallel" position to permit the action of said biasing means, means for initially effecting series acceleration of said motors by actuating said controller through said first group of positions when said control switch occupies its "series" position, means for actuating said control switch to its "parallel" position whereby the motor circuit is opened, means for effecting the reclosure of said circuit when the controller is returned to its initial operative position, and means for subsequently effecting series-parallel and parallel acceleration when said controller is actuated through said two groups of positions.

10. In a system of control, the combination with a plurality of pairs of electric motors, of a governing controller therefor having only two groups of accelerating positions, a series-parallel switching device for connecting each pair of motors in series or parallel relation, means for biasing said switching device to the parallel-connecting position, electrical means for overcoming said biasing means to actuate said device to the series-connecting position, an auxiliary control switch adapted in a "series" position to effect the energization of said electrical means through said controller and adapted in a "parallel" position to permit the action of said biasing means, means for initially effecting series acceleration of said motors by actuating said controller through said first group of positions when said control switch occupies its "series" position, means for actuating said control switch to its "parallel" position whereby the motor circuit is opened and the series-parallel switching device is automatically returned to its parallel position, means dependent upon the switching device in that position for effecting the reclosure of said motor circuit when the controller is returned to its initial operative position, and means for subsequently effecting series-parallel and parallel acceleration when said controller is actuated through said two groups of positions.

11. In a system of control, the combination with a plurality of dynamo-electric machines and an accelerating resistor therefor, of means comprising a switching device biased to the "parallel" position for effecting series and series-parallel operation and series-parallel and parallel operation of said machines, and means for including said resistor in the circuit of said machines before effecting said operations.

12. In a system of control, the combination with a plurality of electric motors, of a governing controller therefor having only two groups of accelerating positions, a series-parallel switching device for connecting said motors in series or parallel relation, means for initially effecting series acceleration of said motors by actuating said controller through said first group of positions and series-parallel acceleration of said motors by actuating said controller through said second group of positions when said device occupies its "series" position and for subsequently effecting series-parallel and parallel acceleration of said motors by first returning the controller to its initial operative position and actuating said controller through said two groups of positions when said device occupies its "parallel" position.

In testimony whereof, we have hereunto subscribed our names this 26th day of Oct., 1915.

JOHN A. CLARKE, Jr.
SAMUEL B. SCHENCK.